(12) United States Patent
Yokoyama

(10) Patent No.: US 8,950,537 B2
(45) Date of Patent: Feb. 10, 2015

(54) BATTERY SYSTEM FOR VEHICLE

(71) Applicant: Fuji Jukogyo Kabushiki Kaisha, Tokyo (JP)

(72) Inventor: Yutaka Yokoyama, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/846,704

(22) Filed: Mar. 18, 2013

(65) Prior Publication Data

US 2013/0273755 A1    Oct. 17, 2013

(30) Foreign Application Priority Data

Apr. 11, 2012 (JP) ................. 2012-090258

(51) Int. Cl.
   *B60K 1/04* (2006.01)
   *B60R 16/023* (2006.01)
   *H01M 2/10* (2006.01)
   *H01M 10/42* (2006.01)
   *H01M 10/48* (2006.01)

(52) U.S. Cl.
   CPC ......... B60R 16/0239 (2013.01); H01M 2/1083 (2013.01); H01M 10/425 (2013.01); *H01M 10/48* (2013.01); *H01M 2010/4271* (2013.01); *H01M 2220/20* (2013.01); *Y10S 903/952* (2013.01)
   USPC ........................................ 180/68.5; 903/952

(58) Field of Classification Search
   USPC ............... 180/68.5; 903/951, 952; 429/7, 121
   See application file for complete search history.

(56) References Cited

U.S. PATENT DOCUMENTS

| | | | | |
|---|---|---|---|---|
| 4,691,198 | A * | 9/1987 | Mortensen | 340/649 |
| 5,853,058 | A * | 12/1998 | Endo et al. | 180/65.1 |
| 6,010,375 | A * | 1/2000 | Higuchi | 439/763 |
| 6,188,574 | B1 * | 2/2001 | Anazawa | 361/695 |
| 6,319,013 | B2 * | 11/2001 | Nakao et al. | 439/34 |
| 6,436,570 | B1 * | 8/2002 | Chalasani et al. | 429/121 |
| 7,070,015 | B2 * | 7/2006 | Mathews et al. | 180/68.5 |
| 7,400,111 | B2 * | 7/2008 | Kishibata et al. | 320/104 |
| 7,688,582 | B2 * | 3/2010 | Fukazu et al. | 361/690 |
| 2003/0089540 | A1 * | 5/2003 | Koike et al. | 180/68.5 |
| 2003/0129482 | A1 * | 7/2003 | Zhou et al. | 429/100 |
| 2005/0161276 | A1 * | 7/2005 | Jones et al. | 180/291 |
| 2009/0004554 | A1 * | 1/2009 | Reed et al. | 429/97 |

FOREIGN PATENT DOCUMENTS

JP    2007-299593 A    11/2007

* cited by examiner

*Primary Examiner* — Frank Vanaman
(74) *Attorney, Agent, or Firm* — McGinn IP Law Group, PLLC

(57) ABSTRACT

A battery system for a vehicle. The battery system includes: a battery module; a junction box which connects the battery module to other electronic components; and a case which includes the battery module and the junction box. The junction box is integrally mounted on a side surface of the battery module which is fixed to the case, and at least the junction box is non-contact with an inner surface of the case.

13 Claims, 2 Drawing Sheets

BATTERY SYSTEM FOR VEHICLE

CROSS-REFERENCE TO RELATED APPLICATIONS

The present application claims priority from Japanese Patent Application No. 2012-090258 filed on Apr. 11, 2012, the entire contents of which are hereby incorporated by reference.

BACKGROUND OF THE INVENTION

1. Field of the Invention

The present invention relates to a battery system for a vehicle, and particularly, to a battery system for a hybrid vehicle or an electric vehicle.

2. Description of the Related Art

Some hybrid and electric vehicles released in recent years differ in the configuration in which a battery module to be mounted and a junction box which for connecting the battery module to other electronic components are disposed. For example, Japanese Unexamined Patent Application Publication No. 2007-299593 (hereinafter referred to as JP-A No. 2007-299593) discloses a hybrid vehicle having a configuration in which a center console box between the driver's seat and the assistant driver's seat is provided with a battery pack assembly, and a junction box is disposed on top of the battery pack assembly.

However, when a junction box is disposed on top of the battery module as in the configuration of the technology disclosed in JP-A No. 2007-299593, there is a problem in that the height of the center console box tends to increase, and thus it is difficult to effectively use the space inside the vehicle, for example, by disposing a case, in which the junction box and the battery module are disposed, below the luggage compartment at the rear of the vehicle. Now, an approach may be taken in which the junction box is disposed not on top of the battery module, but at the side of the battery module in the case so as to reduce the height of the case. However, when the junction box and the battery module are fixed to respective surfaces with different heights and vibration is transmitted to the junction box and the battery module, the vibration causes a relative positional difference between the junction box and the battery module, and thus a busbar which connects between the junction box and the battery module may be damaged. When the junction box is directly fixed to the case, operating noise or vibration due to a relay or the like in the junction box is transmitted to the case and further amplified, so that loud noise may be transmitted to the vehicle cabin. In order to prevent such an event, it is necessary to increase the thickness of the plate of the case, and/or provide a reinforcing member. However, this increases the weight of the case and the cost. Replacing the busbar with a more flexible one also increases the cost, and allowing relative motion between the junction box and the battery module in this manner involves a corresponding amount of reserved space in consideration of the relative motion, and thus the space to be reserved may increase.

SUMMARY OF THE INVENTION

The present invention has been made in view of the above-mentioned circumstances, and it is an object of the invention to provide a battery system for a vehicle, which allows the junction box and the battery module to be disposed in a space-saving manner at a low height without increasing the weight, cost, and the overall height of the junction box and the battery module, and in which operating noise or vibration noise due to a relay or the like which occurs in the junction box is not transmitted to the vehicle cabin, and damage of the busbar or the like is prevented.

An aspect of the present invention provides a battery system for a vehicle, the battery system including a battery module; a junction box which connects the battery module to other electronic components; and a case which includes the battery module and the junction box. The junction box is integrally mounted on a side surface of the battery module which is fixed to the case, and at least the junction box is non-contact with an inner surface of the case.

DESCRIPTION OF THE PREFERRED EMBODIMENTS

Figure 1:
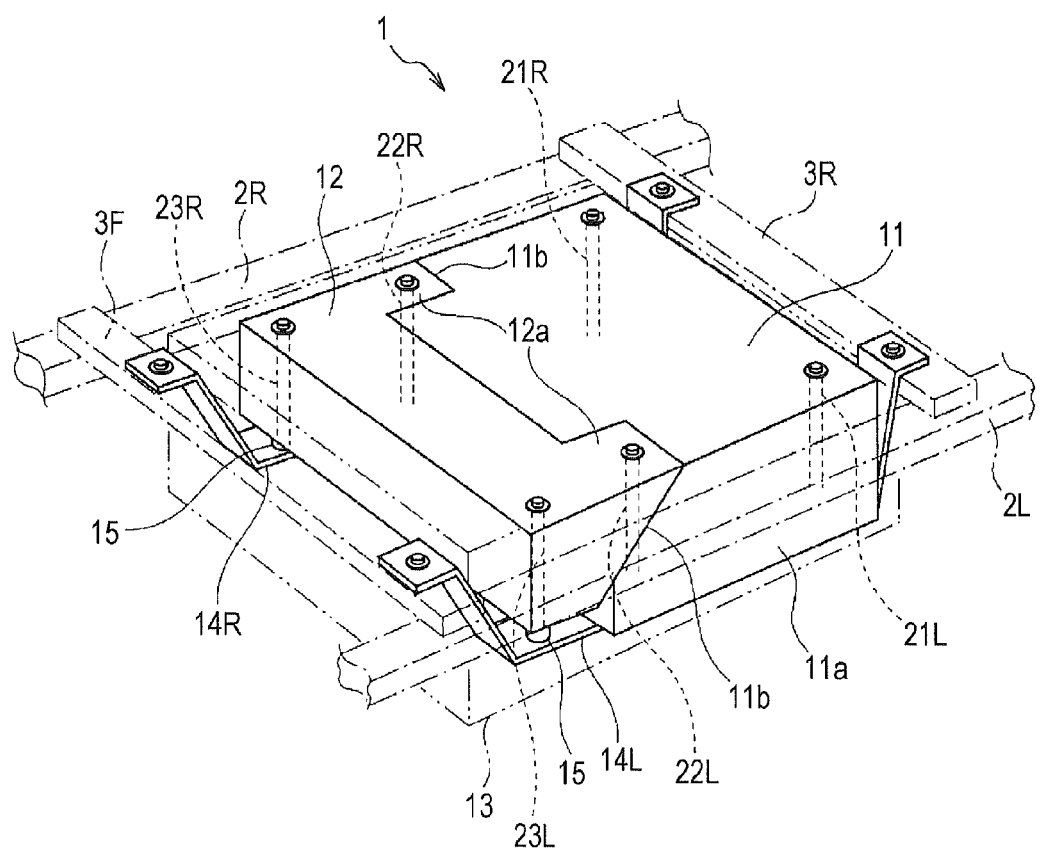
FIG. 1 is a perspective view of a battery pack according to an embodiment of the present invention, the battery pack being disposed below a luggage compartment.

Hereafter, an embodiment of the present invention will be described with reference to the accompanying drawings. In the drawings, numeral 1 indicates a battery pack which serves as a battery system of a hybrid vehicle, and the battery pack 1 is suspended from and supported by the bottom of a luggage compartment between a front cross member 3F and a rear cross member 3R, which are installed in the front-and-rear direction between a rear side frame 2L on the left side of the vehicle, and a rear side frame 2R on the right side of the vehicle.

The battery pack 1 includes a battery module 11, a junction box 12, and a case 13 which houses the battery module 11 and the junction box 12.

The battery module 11 is formed as a battery case 11a in which e.g., a plurality of battery cells (not illustrated) are stacked, and a slope section 11b is formed at each of the right and left end portions of the front side of the battery case 11a in such a manner that the slope section 11b is downwardly inclined with respect to the upper surface of the battery case 11a.

The junction box 12 connects the battery module 11 to other electronic components such as a DC-DC converter or an inverter, and includes a relay (not illustrated) which controls a high-voltage circuit of the battery, various sensors (not illustrated) which detect the total voltage and charge/discharge currents of the battery, and a service plug (not illustrated) which blocks the high-voltage circuit with the height dimension of the junction box 12 smaller than the height dimension of the battery module 11. At the right and left end portions of the rear surface of the junction box 12, slope sections 12a, 12a are respectively formed in shapes corresponding to the slope sections 11b, 11b, at positions corresponding to the slope sections 11b, 11b at the front of the battery case 11a in such a manner that the slope sections 12a, 12a are upwardly inclined with respect to the lower surface of the junction box 12.

The lower surfaces of the slope sections 12a, 12a of the junction box 12 are then opposed and connected to the upper surfaces of the slope sections 11b, 11b of the battery case 11a, and thus the upper surfaces of the battery module 11 and the junction box 12 are substantially coplanar, and the junction box 12 is integrally mounted on an upper portion of the front side surface of the battery module 11.

Specifically, the integrated battery module 11 and the junction box 12 are housed in the case 13 via a pair of U-shaped right and left fixing frames 14L, 14R, and supported by the front and rear cross members 3F, 3R, the right and left fixing frames 14L, 14R being formed extending in the front-and-rear direction below the undersurface of the battery module 11 and supporting the battery module 11 and the junction box 12 from below.

The left rear end portion of the battery module 11 is fixed to the rear end of the fixing frame 14L by a bolt 21L which penetrates through the upper surface of the battery module 11, and the left front end portion of the battery module 11 along with the junction box 12 is fixed to an approximately center of the fixing frame 14L by a bolt 22L which penetrates through the upper surface of the slope section 12a at the left rear end of the junction box 12. Similarly, the right rear end portion of the battery module 11 is fixed to the rear end of the fixing frame 14R by a bolt 21R which penetrates through the upper surface of the battery module 11, and the right front end portion of the battery module 11 along with the junction box 12 is fixed to an approximately center of the fixing frame 14R by a bolt 22R which penetrates through the upper surface of the slope section 12a at the right rear end of the junction box 12.

The left front end portion of the junction box 12 is fixed to a front end portion of the fixing frame 14L via an interposed elastic members 15 such as rubber by a bolt 23L which penetrates through the upper surface of the junction box 12, and the right front end portion of the junction box 12 is fixed to a front end portion of the fixing frame 14R via an interposed elastic members 15 such as rubber by a bolt 23R which penetrates through the upper surface of the junction box 12.

Figure 2:
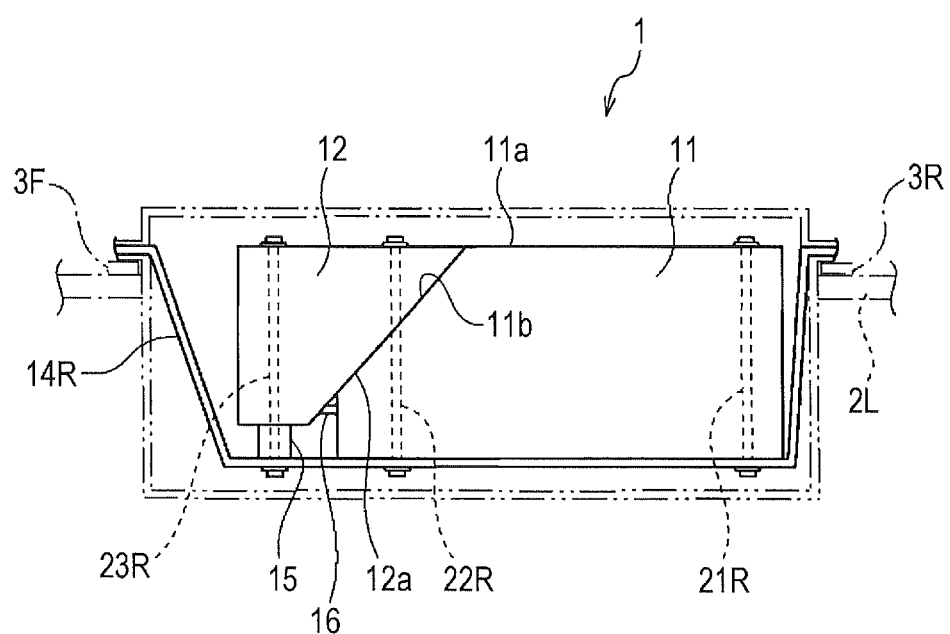
FIG. 2 is an illustrative view from the left side of the battery pack according to the embodiment of the present invention.

Numeral 16 in FIG. 2 indicates a busbar which connects the battery module 11 to the junction box 12.

In the battery pack 1 according to the thus-configured embodiment of the invention, when vibration is transferred from the vehicle body, the vibration is transmitted via the fixing frames 14L, 14R to the battery module 11 having the front side surface on which the junction box 12 is integrally mounted, and thus the vibration is not separately transmitted to the battery module 11 and junction box 12. For this reason, no relative motion occurs between the battery module 11 and the junction box 1, and thus no stress is applied to the busbar 16 which connects the battery module 11 and the junction box 12, and therefore, without changing the quality of the material of the busbar 16 and increasing the weight or cost for reinforcement, and even without considering extra space allowing relative motion between the battery module 11 and the junction box 1, the battery module 11 and the junction box 1 can be disposed in a space-saving manner and damage of the busbar 16 can be appropriately prevented. It is to be noted that the front end portion of the junction box 12 is supported by the fixing frames 14L, 14R with the elastic member 15 interposed therebetween, and thus vibration transmitted from the fixing frames 14L, 14R is significantly small. By supporting the junction box 12 via the elastic member 15 as in the present embodiment, even when the junction box 12 is supported with a large overhang from the side surface of the battery module 11, the junction box 12 can be stably and integrally supported with the battery module 11.

The junction box 12 is non-contact with the case 13 and integrally mounted on the side surface of the battery module 11, and thus operating noise or vibration due to a relay or the like in the junction box 12 is not transmitted via the case 13 to the vehicle cabin, but is transmitted to the heavy battery module 11 on which the junction box 12 is integrally mounted, and is subsequently transmitted to the fixing frames 14L, 14R. Thus, the operating noise and vibration are absorbed by the battery module 11, thereby preventing an increase in the operating noise and vibration.

In addition, the junction box 12 is integrally mounted on the side surface of the battery module 11, and thus the overall height of the junction box 12 and the battery module 11 is not increased, and so the space in the cabin of the vehicle can be effectively used, for example, the case 13, in which the battery module and the junction box are disposed, can be easily disposed below the luggage compartment at the rear of the vehicle.

According to the embodiment, attachment of the battery module 11 and the junction box 12 can be made using the bolts 21L, 21R, 22L, 22R, 23L, 23R which penetrate from above, thereby providing improved maintenance performance and assembly performance.

Although the upper surfaces of the battery module 11 and the junction box 12 are substantially coplanar in the embodiment of the present invention, the upper surfaces may be non coplanar. When the junction box 12 has a small overhang from the connection surface with the battery module 11, or has a light weight, only the bolts for connection with the battery module 11 may be used. Furthermore, the shape of the vertically crossing portion of the connection between battery module 11 and the junction box 12 is not limited to the shape of the slope sections 11b, 11b, 12a, 12a in the embodiment of the present invention, and may be in a step-like crossing shape. In addition, although the battery module 11 and the junction box 12 are housed in the case 13 via the fixing frames 14L, 14R, and supported by the front and rear cross members 3F, 3R in the embodiment of the present invention, the battery module 11 and the junction box 12 may be housed in the case 13 without using the fixing frames 14L, 14R, and are supported by the front and rear cross members 3F, 3R.

What is claimed is:

1. A battery system for a vehicle comprising:
a battery module;
a junction box connecting the battery module to other electronic components; and
a case including the battery module and the junction box,
wherein the junction box is integrally mounted on a side surface of the battery module which is fixed to the case, and at least the junction box is non-contact with an inner surface of the case,
wherein the integrally mounted battery module and the junction box are fixed to the case via a fixing frame,
wherein the junction box is provided with an elastic member at a bottom surface, and is supported by the elastic member from below, and
wherein an upper surface of the junction box and an upper surface of the battery module are coplanar.

2. The battery system for a vehicle according to claim 1, wherein a connection between the battery module and the junction box forms a vertically crossing portion, and the junction box is vertically secured to the battery module by inserting a bolt which penetrates through the crossing portion.

3. The battery system for a vehicle according to claim 1, wherein the junction box protrudes in a horizontal direction from the battery module.

4. The battery system for a vehicle according to claim 1, further comprising a bulbar which connects the battery module to the junction box.

5. The battery system for a vehicle according to claim 1, further comprising a busbar connecting the battery module to a portion of the junction box which is in non-contact with the battery module.

6. The battery system for a vehicle according to claim 1, wherein the bottom surface of the junction box and a bottom surface of the battery module are non-coplanar.

7. The battery system for a vehicle according to claim 1, wherein the junction box protrudes from the battery module.

8. A battery system for a vehicle comprising:
a battery module;
a junction box connecting the battery module to other electronic components; and
a case including the battery module and the junction box,
wherein the junction box is integrally mounted on a side surface of the battery module which is fixed to the case, and at least the junction box is non-contact with an inner surface of the case,
wherein the integrally mounted battery module and the junction box are fixed to the case via a fixing frame,
wherein the junction box is provided with an elastic member at a bottom surface, and is supported by the elastic member from below,
wherein the battery module comprises a slope section that is downwardly inclined with respect to an upper surface of the battery module,
wherein the junction box comprises a slope section that is upwardly inclined with respect to a lower surface of the junction box, and
wherein the slope section of the junction box is integrally connected to the slope section of the battery module.

9. The battery system for a vehicle according to claim 8, wherein a portion of the slope section of the junction box is non-contact with the battery module.

10. The battery system for a vehicle according to claim 9, further comprising a busbar which connects the portion of the junction box to the battery module.

11. The battery system for a vehicle according to claim 8, wherein an upper surface of the junction box and an upper surface of the battery module are coplanar.

12. The battery system for a vehicle according to claim 11, wherein the bottom surface of the junction box and a bottom surface of the battery module are non-coplanar.

13. The battery system for a vehicle according to claim 8, wherein a portion of the junction box is non-contact with the battery module.

* * * * *